US011115169B2

(12) United States Patent
Wang et al.

(10) Patent No.: US 11,115,169 B2
(45) Date of Patent: Sep. 7, 2021

(54) PARENT NODE DEVICE, TERMINAL DEVICE FOR WIRELESS NETWORK AND DATA TRANSMISSION METHOD THEREOF

(71) Applicant: Samsung Electronics Co., Ltd., Suwon-si (KR)

(72) Inventors: Fei Wang, Xi'an (CN); Jin Zhang, Xi'an (CN); Lifeng Zhao, Xi'an (CN); Yajun Zhi, Xi'an (CN); Zhijun Liu, Xi'an (CN)

(73) Assignee: Samsung Electronics Co., Ltd.

( * ) Notice: Subject to any disclaimer, the term of this patent is extended or adjusted under 35 U.S.C. 154(b) by 176 days.

(21) Appl. No.: 16/163,271

(22) Filed: Oct. 17, 2018

(65) Prior Publication Data

US 2019/0132105 A1 May 2, 2019

(30) Foreign Application Priority Data

Oct. 27, 2017 (CN) .......................... 201711023352.9

(51) Int. Cl.
*H04L 5/00* (2006.01)
*H04L 1/12* (2006.01)
(Continued)

(52) U.S. Cl.
CPC .............. *H04L 5/0055* (2013.01); *H04L 1/12* (2013.01); *H04W 28/06* (2013.01); *H04W 40/248* (2013.01); *H04W 52/02* (2013.01); *H04W 52/0216* (2013.01); *H04W 74/06* (2013.01); *H04W 84/18* (2013.01)

(58) Field of Classification Search
CPC ....... H04L 5/0055; H04L 1/12; H04L 5/0053; H04W 8/26; H04W 28/06; H04W 40/248; H04W 52/02; H04W 52/0216; H04W 74/06; H04W 84/18; H04W 52/0203;
(Continued)

(56) References Cited

U.S. PATENT DOCUMENTS 7,809,012 B2    10/2010  Ruuska
8,351,380 B2 *   1/2013  Kim ...................... H04W 28/06
                                                          370/329
(Continued)

FOREIGN PATENT DOCUMENTS

CN            1738216          2/2006
CN          102404079          4/2012
(Continued)

*Primary Examiner* — Jenee Holland
(74) *Attorney, Agent, or Firm* — Myers Bigel, P.A.

(57) ABSTRACT

An indirect data transmission method may include: calculating an estimated arrival time of a next poll data request of a terminal device according to a receipt time of a poll data request, after the poll data request is received from the terminal device; transmitting data for the terminal device to a cache of a Media Access Control (MAC) layer module at a time point which is a predetermined time length ahead of the estimated arrival time responsive to a determination that there is the data for the terminal device in a network layer module; and transmitting, to the terminal device, an acknowledgement packet indicating that there is the data to be transmitted in the cache of the MAC layer module and the data for the terminal device, responsive to receiving the next poll data request.

20 Claims, 6 Drawing Sheets

(51) Int. Cl.

| | | |
|---|---|---|
| *H04W 52/02* | (2009.01) | |
| *H04W 8/26* | (2009.01) | |
| *H04W 28/06* | (2009.01) | |
| *H04W 40/24* | (2009.01) | |
| *H04W 84/18* | (2009.01) | |
| *H04L 1/18* | (2006.01) | |
| *H04W 28/02* | (2009.01) | |
| *H04W 74/06* | (2009.01) | |

(58) Field of Classification Search
CPC ......... H04W 52/0209; H04W 52/0212; H04W 52/0219; H04W 52/0222; H04W 8/265
See application file for complete search history.

(56) References Cited

U.S. PATENT DOCUMENTS

| | | | |
|---|---|---|---|
| 8,619,707 B2 | 12/2013 | Lee | |
| 9,554,242 B2 | 1/2017 | Hargrave | |
| 2003/0076809 A1* | 4/2003 | Basil | H04L 29/12113 370/346 |
| 2004/0266494 A1* | 12/2004 | Ruuska | H04W 52/0216 455/574 |
| 2005/0210128 A1* | 9/2005 | Cannon | G06F 11/3476 709/224 |
| 2006/0039345 A1 | 2/2006 | Perez-Costa | |
| 2007/0147332 A1* | 6/2007 | Lappetelainen | H04W 74/06 370/346 |
| 2008/0091773 A1* | 4/2008 | Hameen-Anttila | H04L 67/125 709/203 |
| 2009/0268706 A1* | 10/2009 | Featherstone | H04L 47/14 370/345 |
| 2010/0105324 A1* | 4/2010 | Takayama | G06K 7/10297 455/41.2 |
| 2010/0295993 A1 | 11/2010 | Oh | |
| 2012/0078996 A1* | 3/2012 | Shah | H04L 67/325 709/203 |
| 2012/0119902 A1 | 5/2012 | Patro | |
| 2012/0155352 A1 | 6/2012 | Jeong | |
| 2013/0301502 A1* | 11/2013 | Kwon | H04W 52/0216 370/311 |
| 2014/0241724 A1 | 8/2014 | McGarry | |
| 2015/0036572 A1* | 2/2015 | Seok | H04W 84/12 370/311 |
| 2015/0103720 A1* | 4/2015 | Loc | H04W 52/0222 370/311 |
| 2015/0341874 A1 | 11/2015 | Nguyen-Dang | |
| 2016/0170398 A1* | 6/2016 | Yoshikawa | G05B 19/05 700/83 |
| 2016/0183240 A1* | 6/2016 | Hu | H04J 11/00 455/67.11 |
| 2016/0191584 A1* | 6/2016 | Dickow | H04L 67/12 709/219 |
| 2017/0093531 A1 | 3/2017 | Hargrave | |
| 2019/0334604 A1* | 10/2019 | Kusano | H04B 7/043 |

FOREIGN PATENT DOCUMENTS

| | | |
|---|---|---|
| CN | 106453231 | 2/2017 |
| EP | 1729476 | 12/2006 |
| JP | 5163352 | 3/2013 |
| KR | 100952229 | 4/2010 |

* cited by examiner

PARENT NODE DEVICE, TERMINAL DEVICE FOR WIRELESS NETWORK AND DATA TRANSMISSION METHOD THEREOF

CROSS-REFERENCE TO RELATED APPLICATION

This U.S. non-provisional patent application claims priority under 35 U.S.C. § 119 to Chinese Patent Application No. 201711023352.9, filed on Oct. 27, 2017, in the Chinese State Intellectual Property Office, the entire content of which is incorporated herein by reference.

BACKGROUND

Technical Field

The present disclosure relates to the technical field of wireless data transmission, and more particularly, relates to a parent node device and a terminal device for a wireless network, and a data transmission method thereof.

Description of the Related Art

A plurality of types of short distance wireless communication techniques exist. Some features of the short distance wireless communication techniques include a short transmission distance, low power consumption, low velocity, and low cost. Some short distance wireless communication techniques may be embedded into various kinds of mobile devices or terminal devices to satisfy, for example, low cost and low power consumption requirements of a wireless sensor network.

In the case of a wireless communication network, such as, for example, a ZigBee network, when a terminal device enters into a sleep state, the sleep state may last for dozens of minutes. When the terminal device is in the sleep state, a data in a cache of a parent node device cannot be transmitted to the terminal device. However, the cache may be limited in capacity, and the data in the cache may overflow with the incremental addition of the data in the cache, resulting in data loss.

SUMMARY

Example embodiments of the present disclosure provide a parent node device and a terminal device for a wireless network, and data transmission methods thereof, to perform, for example, indirect data transmission of a non-beacon ZigBee network.

According to an example embodiment of the present disclosure, there is provided a data transmission method for a wireless network, which may include: calculating an estimated arrival time of a next poll data request of a terminal device according to a receipt time of a poll data request, after the poll data request is received from the terminal device; transmitting data for the terminal device to a cache of a Media Access Control (MAC) layer module at a time point which is a predetermined time length ahead of the estimated arrival time, responsive to a determination that the data for the terminal device is in a network layer module; and transmitting, to the terminal device, an acknowledgement packet indicating that the data for the terminal device is in the cache of the MAC layer module and the data for the terminal device, responsive to receiving the next poll data request.

According to an example embodiment of the present disclosure, there is provided a parent node device for a wireless network, which may include: a network layer module configured to calculate an estimated arrival time of a next poll data request of a terminal device according to a receipt time of a poll data request that is received from the terminal device, and transmit data for the terminal device to a cache of a Media Access Control (MAC) layer module at a time point which is a predetermined time length ahead of the estimated arrival time, responsive to a determination that the data for the terminal device is in the network layer module; and the MAC layer module configured to transmit, to the terminal device, an acknowledgement packet indicating that the data for the terminal device is in the cache of the MAC layer module and the data for the terminal device, responsive to receiving the next poll data request.

According to an example embodiment of the present disclosure, there is provided a non-transitory computer readable storage medium on which a computer program is stored, wherein the computer program is configured to enable a processor of a computer to execute operations including: calculating an estimated arrival time of a next poll data request of a terminal device according to a receipt time of a poll data request, after the poll data request is received from the terminal device; transmitting data for the terminal device to a cache of a Media Access Control (MAC) layer module at a time point which is a predetermined time length ahead of the estimated arrival time, responsive to a determination that the data for the terminal device is in a network layer module; and transmitting, to the terminal device, an acknowledgement packet indicating that the data for the terminal device is in the cache of the MAC layer module and the data for the terminal device, responsive to receiving the next poll data request According to an example embodiment of the present disclosure, there is provided an data receiving method for a wireless network, which may include: modifying a time interval of transmitting a poll data request from a first time interval to a modified time interval according to a preset condition, responsive to receiving, at a terminal device from a parent node device, data for the terminal device and an acknowledgement packet indicating that the data for the terminal device is present on the parent node device; and transmitting at least three poll data requests to the parent node device at the modified time interval.

According to an example embodiment of the present disclosure, there is provided a terminal device for a wireless network, which may include: a velocity modification module configured to modify a time interval of transmitting a poll data request from a first time interval to a modified time interval according to a preset condition, responsive to receiving, from a parent node device, data for the terminal device and an acknowledgement packet indicating that the data for the terminal device is present on the parent node device; and a request transmission module configured to transmit at least three poll data requests to the parent node device at the modified time interval.

According to an example embodiment of the present disclosure, there is provided a non-transitory computer readable storage medium on which a computer program is stored, wherein the computer program is configured to enable a processor of a computer to execute operations including: modifying a time interval of transmitting a poll data request from a first time interval to a modified time interval according to a preset condition, responsive to receiving, at a terminal device from a parent node device, data for the terminal device and an acknowledgement packet indicating that the data for the terminal device is present on the parent node device; and transmitting at least three poll data requests to the parent node device at the modified time interval Other aspects and/or advantages of the general concepts of the present disclosure will be explained in the following description.

BRIEF DESCRIPTION OF THE DRAWINGS

The above and other purposes and features of the example embodiments of the present disclosure will become clearer, from the descriptions in combination with the accompanying drawings below, which illustrate the embodiments, and in which.

DETAILED DESCRIPTION

Figure 1:
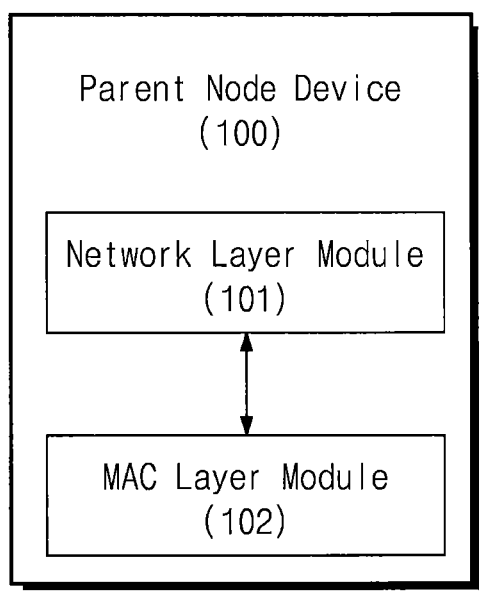
FIG. 1 illustrates a block diagram of a parent node device according to an example embodiment of the present disclosure.

The embodiment of the present disclosure, an example of which is illustrated in the accompanying drawings, will now be referred to in detail, wherein the same reference numeral indicates the same and/or similar part throughout the accompanying drawings. The embodiment will be illustrated below with reference to the accompanying drawings, so as to explain the present disclosure.

In the illustration below, a ZigBee network is taken as an example to illustrate embodiments of the present disclosure. The Zigbee network protocol is an IEEE 802.15.4-based specification for a suite of high-level communication protocols used to create personal area networks with small, low-power digital radios. However, it should be understood that, a technical solution of the embodiments of the present disclosure is not limited to the ZigBee network, and may further be applied to other wireless communication networks, including those that have mechanisms identical and/or similar to the ZigBee network.

The ZigBee protocol specification version R21 introduces a keep-alive mechanism for a terminal device. On that basis, when a parent node device such as a coordinator or a router supports a poll mechanism of an MAC layer module, the terminal device may periodically transmit a poll data request to the parent node device so as to indicate that there is a normal connection with the parent node device. The parent node device may reply an acknowledgement packet with respect to each poll data request. When the parent node device receives no poll data request from the terminal device within an expiring time period, the parent node device may consider the terminal device as being disconnected from the network, and/or when an acknowledgement packet from the parent node device is not received in time, the terminal device may be considered as being disconnected from the parent node device, and the terminal device may need to re-select and/or reconnect to enter into a network.

In addition, a terminal device supporting a sleep mode may acquire data from the parent node device through a poll data request. When receiving the poll data request, if it is found that there is data in a cache (for example, a cache of the MAC layer module), the parent node device may notify the terminal device that there is data to be transmitted to the terminal device, by setting a pending bit in a poll acknowledgement as 1, and transmit the data to be transmitted to the terminal device.

With respect to a terminal device supporting the sleep mode, after entering into a network, the terminal device may negotiate, with the parent node device, an expiring time and/or an expiring time period for determining whether a connection is normal through a timeout request. For example, when the parent node device receives the poll data request of the terminal device within the expiring time period, it represents that the connection is normal. The expiring time may include, for example, the following values: 10 seconds, 2 minutes, 4 minutes, 8 minutes, 16 minutes, 32 minutes, 64 minutes, 128 minutes, 256 minutes, 512 minutes, 1024 minutes, 2048 minutes, 4096 minutes, 8192 minutes, and 16384 minutes, though the present disclosure is not limited thereto.

In addition, with respect to the parent node device, a time for the network layer module to transmit the data to the MAC layer module (for example, a cache of the MAC layer module) may not be fixed. With respect to the terminal device, within the expiring time, the terminal device may have two states: a sleep state where the terminal device disables a Radio Frequency (RF) function to save power and an awake state. A data transmission method for a ZigBee network according to an example embodiment of the present disclosure may define a time for a network layer module to transmit data to a cache of an MAC layer module, so that the terminal device switches between the sleep state and the awake state in an improved way, to improve data transmission efficiency.

FIG. 1 illustrates a block diagram of a parent node device 100 according to an example embodiment of the present disclosure.

Referring to FIG. 1, a parent node device 100 includes a network layer module 101 and an MAC layer module 102. In some embodiments, a control module (not shown) may be established between the network layer module 101 and the MAC layer module 102 and may be used to control data communication between the network layer module 101 and the MAC layer module 102. The network layer module 101 may be configured to receive a poll data request from a terminal device, to calculate an estimated arrival time of a next poll data request of the terminal device according to a receipt time of the poll data request, and/or to transmit a data to be transmitted to a cache of the MAC layer module 102 at a time point which is a predetermined time length ahead of the estimated arrival time of the next poll data request of the terminal device.

As an example, the network layer module 101 may include a time interval calculation module (not shown) configured to calculate a time interval between two continuous poll data requests of the terminal device and an estimated arrival time acquisition module (not shown) configured to acquire the estimated arrival time of the next poll data request of the terminal device according to the time interval and an arrival time of a previous poll data request from the terminal device.

As an example, the network layer module 101 may further include: a time setting module (not shown), wherein when the poll data request of the terminal device is received for the first time, the time setting module may set a current time as a first time. When the poll data request of the terminal device is not received for the first time (e.g., at a current time after the first time), the time setting module may subtract the first time from the current time to obtain the time interval, may add the current time to the time interval to obtain the estimated arrival time for the next poll data request, may set the first time to the current time, and may set the estimated arrival time as a second time. For example, two attributes, namely last_poll and next_poll, may be set for a neighbor table to record the first time and the second time respectively.

As an example, the network layer module 101 may further include: a transmission list management module (not shown) and a timing transmission module (not shown). The transmission list management module may be configured to establish a data transmission list (e.g., a data transmission queue) and update the preset transmission time to the above mentioned time point which is the predetermined time length ahead of the estimated arrival time of the next poll data request of the terminal device, wherein the data transmission list may store a data packet (for example, the above mentioned data to be transmitted to the terminal device) which needs to be transmitted from the network layer module 101 to the cache of the MAC layer module 102 at a preset transmission time. For example, the data transmission list may include the data to be transmitted and a preset transmission time corresponding to the data to be transmitted (a default interval between two neighbor preset transmission times is one third of the above mentioned expiring time period, which is the longest time interval suggested in a protocol specification). The timing transmission module may be configured to transmit the data to be transmitted corresponding to the time point to the cache of the MAC layer module 102, when the time point arrives. For example, the timing transmission module may check periodically the data transmission list at a time interval such as, for example, 50 milliseconds, and when the time point (e.g., the predetermined time length ahead of the estimated arrival time of the next poll data request of the terminal device) arrives, may transmit the data to be transmitted corresponding to the time point to the cache of the MAC layer module 102. At this time, the transmission list management module may further mark the data to be transmitted which has been transmitted to the cache (for example, marking the data as transmitted), so as to avoid repetitive transmission.

The MAC layer module 102 may be configured to transmit an acknowledgement packet indicating that there is the data to be transmitted (e.g., for the terminal device) in the cache of the MAC layer module 102, and the data for the terminal device, to the terminal device, when the next poll data request is received by the network layer module 101. For example, the data for the terminal device may be transmitted in a form of an acknowledgement packet.

As an example, the MAC layer module 102 may transmit a success confirmation message after transmitting the data for the terminal device to the terminal device. After the network layer module 101 receives the success confirmation message, the transmission list management module may remove the corresponding data from the data transmission list. In addition, if no poll data request of the terminal device is received when a preset time (for example, the estimated arrival time) arrives, it may be considered that the data transmission has failed. When the data transmission fails, the mark of the data which is marked as transmitted may be removed. A statistic may be made on a number of times for which data transmission fails, and when the number of times for which data transmission fails reaches a preset number, the corresponding data may be removed from the data transmission list.

For example, the acknowledgement packet may include a Poll Acknowledgement (Poll ACK), and a flag bit (for example, a pending bit) of the Poll ACK may be used to represent whether the cache of the MAC layer module includes the data for the terminal device which will be transmitted to the terminal device. For example, when the pending bit is 1, it may represent that the data for the terminal device is present, and when the pending bit is 0, it may represent that there is no data to be transmitted.

As an example, the wireless network may be a non-beacon ZigBee network, and the parent node device may be a ZigBee coordinator or a ZigBee router. The wireless network may comply with the IEEE 802.15.4 standard.

Figure 2:
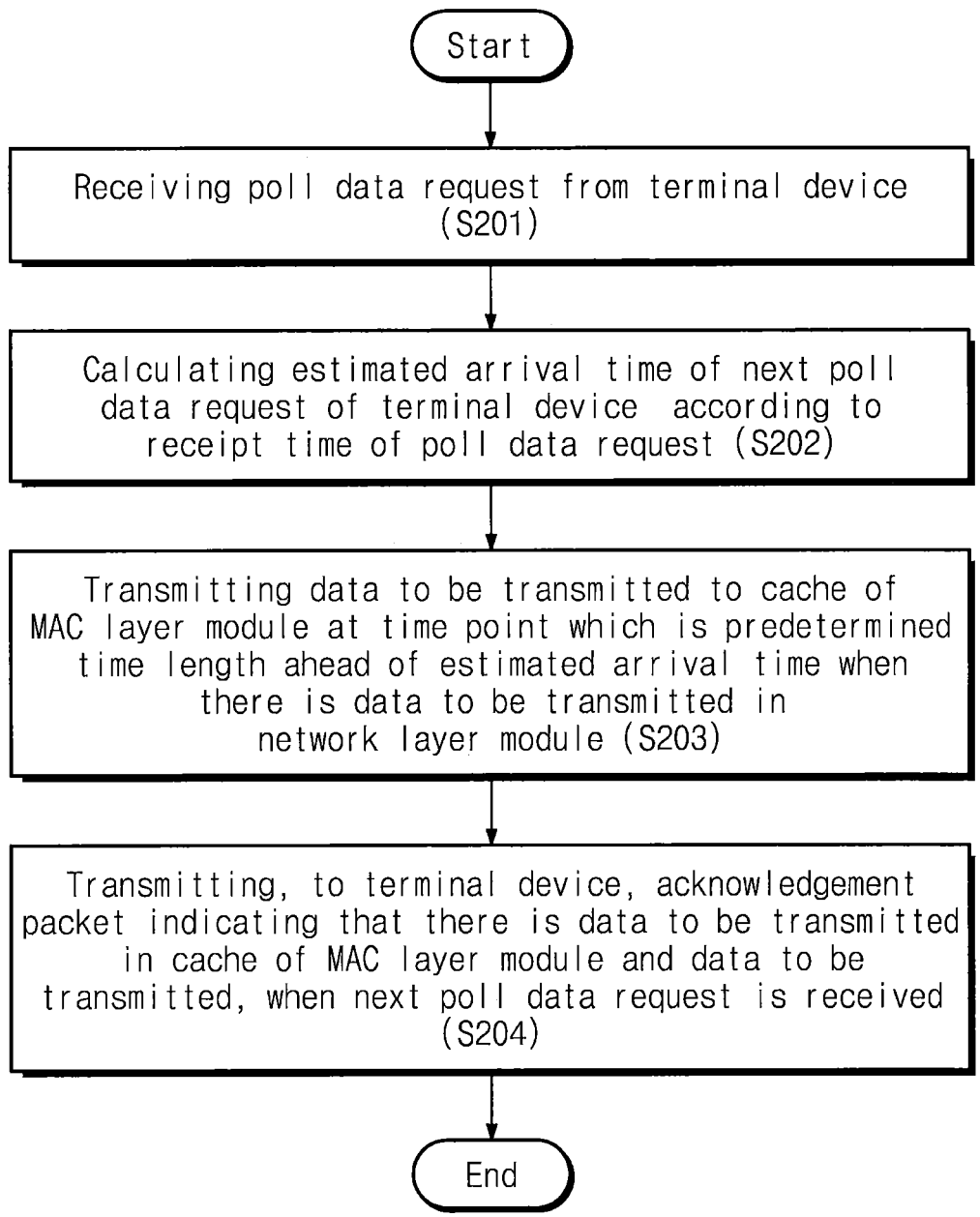
FIG. 2 illustrates a flowchart of an indirect data transmission method for a wireless network according to an example embodiment of the present disclosure.

FIG. 2 illustrates a flowchart of an indirect data transmission method for a wireless network according to an example embodiment of the present disclosure.

Referring to FIG. 2, at step S201, a poll data request may be received from a terminal device. For example, at least a predetermined number (e.g., three) poll data requests may be received. For example two initial poll data requests may be used to calculate the time interval of receiving the poll data requests, and an acknowledgement packet may be transmitted when the third poll data request is received.

At step S202, an estimated arrival time of a next poll data request of the terminal device may be calculated according to a receipt time of the poll data request.

As an example, the estimated arrival time may be calculated by calculating a time interval between two continuous poll data requests of the terminal device (e.g., a first poll data request and a second, subsequent, poll data request); and acquiring the estimated arrival time according to the time interval between the two continuous poll data requests and an arrival time of a previous poll data request (e.g., the second poll data request).

As an example, the estimated arrival time may also be calculated through the following steps: when a first poll data request of the terminal device is first received, setting a current time as a first time; when a second poll data request of the terminal device is next received, subtracting the first time from the current time to obtain the time interval (e.g., between the first poll data request and the second poll data request), adding the current time to the time interval to obtain the estimated arrival time of a next poll data request, setting the current time as the first time, and setting the estimated arrival time as the second time. For example, two attributes, namely last_poll and next_poll, may be set for a neighbor table to record the first time and the second time respectively.

At step S203, when there is the data to be transmitted to the terminal device in the network layer module, the data for the terminal device is transmitted to a cache of a MAC layer module at a time point which is a predetermined time length ahead of the estimated arrival time. For example, the data to be transmitted (e.g. for the terminal device) may be transmitted to a cache of an MAC layer module at a time point which is 100 milliseconds ahead of the previously-calculated estimated arrival time.

As an example, step S203 may further include establishing a data transmission list (or a data transmission queue), updating the preset transmission time to the above mentioned time point which is the predetermined time length ahead of the estimated arrival time, and transmitting the data to be transmitted corresponding to the time point to the cache of the MAC layer module when the time point arrives, wherein the data transmission list may include the data to be transmitted and a preset transmission time corresponding to the data to be transmitted (a default interval between two neighbor preset transmission times may be one third of the above mentioned expiring time period, which is the longest time interval suggested in a protocol specification). For example, the data transmission list may be checked periodically at a time interval such as 50 milliseconds, and when the time point arrives, the data to be transmitted corresponding to the time point may be transmitted to the cache of the MAC layer module. At this time, the data for the terminal device which has been transmitted to the cache may be further marked (for example, marking the data as transmitted), so as to avoid repetitive transmission.

At step S204, an acknowledgement packet indicating that there is the data for the terminal device (e.g., to be transmitted to the terminal device) in the cache of the MAC layer module, and the data for the terminal device, may be transmitted to the terminal device, when the next poll data request is received. For example, the data to be transmitted may be transmitted in a form of an acknowledgement packet. That is, when there is the data to be transmitted, two acknowledgement packets, namely a first acknowledgement packet indicating that there is the data to be transmitted and a second acknowledgement packet including the data to be transmitted, may be transmitted to the terminal device successively.

As an example, when the data for the terminal device is transmitted to the terminal device, the corresponding data to be transmitted may be removed from the data transmission list. In addition, if no poll data request of the terminal device is received when a preset time (for example, the estimated arrival time) arrives, it may be considered that the data transmission has failed. When the data transmission fails, the mark of the data which is marked as transmitted may be removed. A statistic may be maintained indicating a number of times for which data transmission fails, and when the number of times for which data transmission fails for a particular terminal device reaches a preset number, the corresponding data may be removed from the data transmission list.

For example, the acknowledgement packet may include a Poll ACK, and a flag bit (for example, a pending bit) of the Poll ACK may be used to represent whether the cache of the MAC layer module includes the data to be transmitted which will be transmitted to the terminal device. For example, when the pending bit is 1, it may represent that there is the data to be transmitted, and when the pending bit is 0, it may represent that there is no data to be transmitted.

Figure 3:
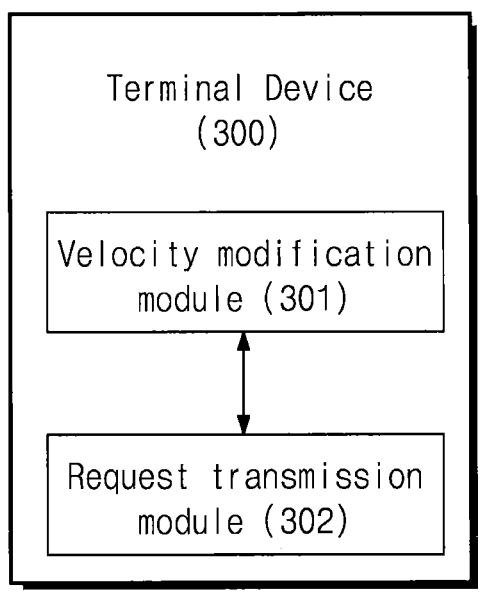
FIG. 3 illustrates a block diagram of a terminal device for a wireless network according to an example embodiment of the present disclosure.

FIG. 3 illustrates a block diagram of a terminal device 300 for a wireless network according to an example embodiment of the present disclosure.

Referring to FIG. 3, a terminal device 300 may include a velocity modification module 301 and a request transmission module 302.

The velocity modification module 301 may be configured to modify a time interval for transmitting a poll data request from a first time interval to a modified time interval according to a preset condition, when a data to be transmitted and an acknowledgement packet indicating that there is the data to be transmitted are received from a parent node device (e.g., parent node device 100 of FIG. 1). The request transmission module 302 may be configured to transmit at least a predefined number (e.g., three) poll data requests to the parent node device at the modified time interval. The preset condition may be set according to a user's requirement, and may be based, in some embodiments, on a time period (e.g., on a time of day). For example, the time interval may be modified to be shortened during daytime, and the time interval may be increased at night. When the time interval is shortened, the data to be transmitted to the terminal device may be acquired more timely and quickly.

As an example, the velocity modification module 301 may be further configured to reset the modified time interval to the time interval before the modification (e.g., the first time interval) when an acknowledgement packet indicating that there is no data to be transmitted is received from the parent node device. The terminal device may further include a sleep module (not shown) configured to enable the terminal device to enter into a sleep mode when the modified time interval is reset to the time interval before the modification.

Figure 4:
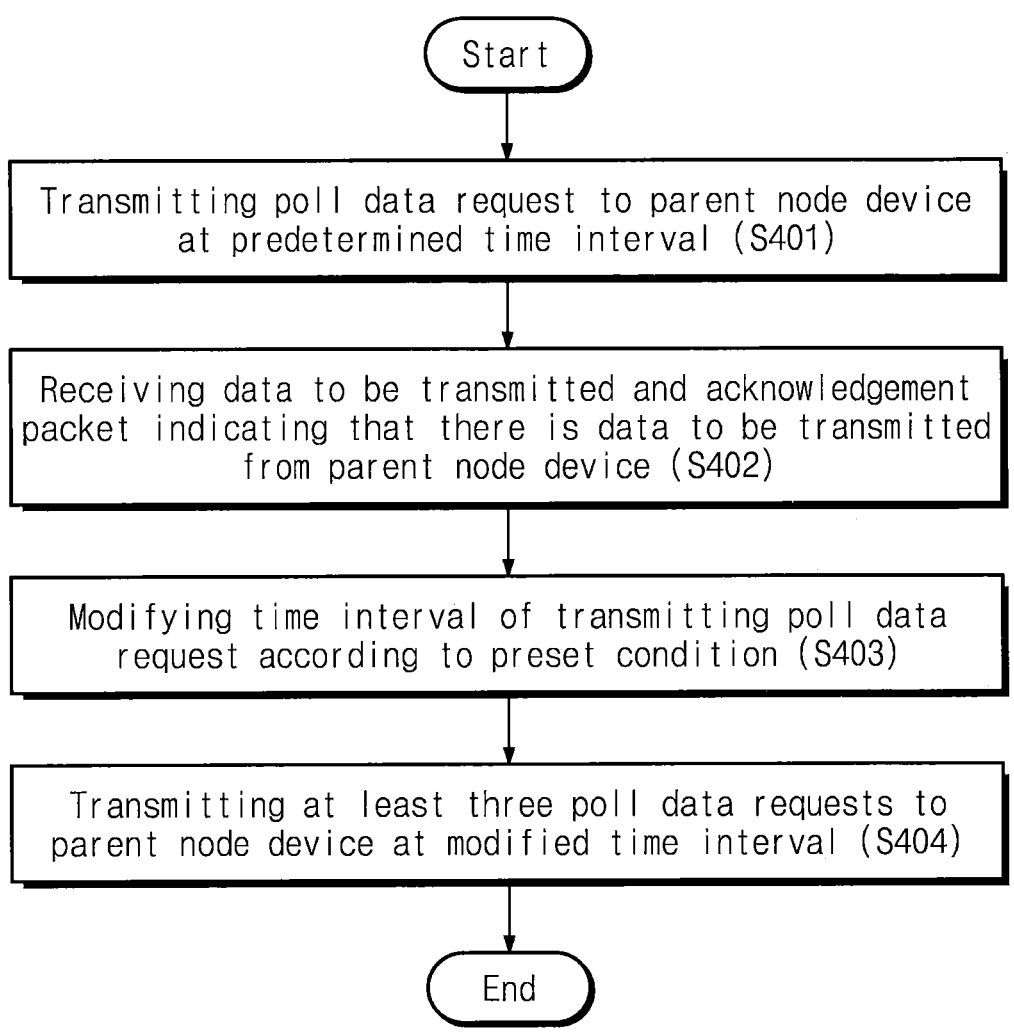
FIG. 4 illustrates a flowchart of an indirect data receiving method for a wireless network according to an example embodiment of the present disclosure.

FIG. 4 illustrates a flowchart of an indirect data receiving method for a wireless network according to an example embodiment of the present disclosure.

Referring to FIG. 4, at step S401, a poll data request may be transmitted by a terminal device (e.g., terminal device 300 of FIG. 3) to a parent node device (e.g., parent node device 100 of FIG. 1) at a predetermined time interval (e.g., a first time interval). At step S402, a data to be transmitted and an acknowledgement packet indicating that there is the data to be transmitted may be received by the terminal device from the parent node device. At step S403, the time interval of transmitting the poll data request may be modified from the first time interval to a modified time interval according to a preset condition. At step S404, at least a predefined number of (e.g., three) poll data requests may be transmitted to the parent node device at the modified time interval. When the time interval for transmitting the poll data request is modified according to the preset condition, for example when the time interval is shortened, the terminal device may acquire the data from the parent node device within a shorter time period. When there is no data in the cache of the parent node device, namely when the acknowledgement packet received from the parent node device indicates that there is no data to be transmitted, the terminal device may reset the modified time interval to the time interval before the modification (e.g., the first time interval), and may enter into a sleep state.

As an example, the preset condition may be set according to a user's requirement and/or may be based on a time period (e.g., a time of day). For example, the time interval may be modified to be shortened at daytime, and the time interval may be modified to be increased at night.

Figure 5:
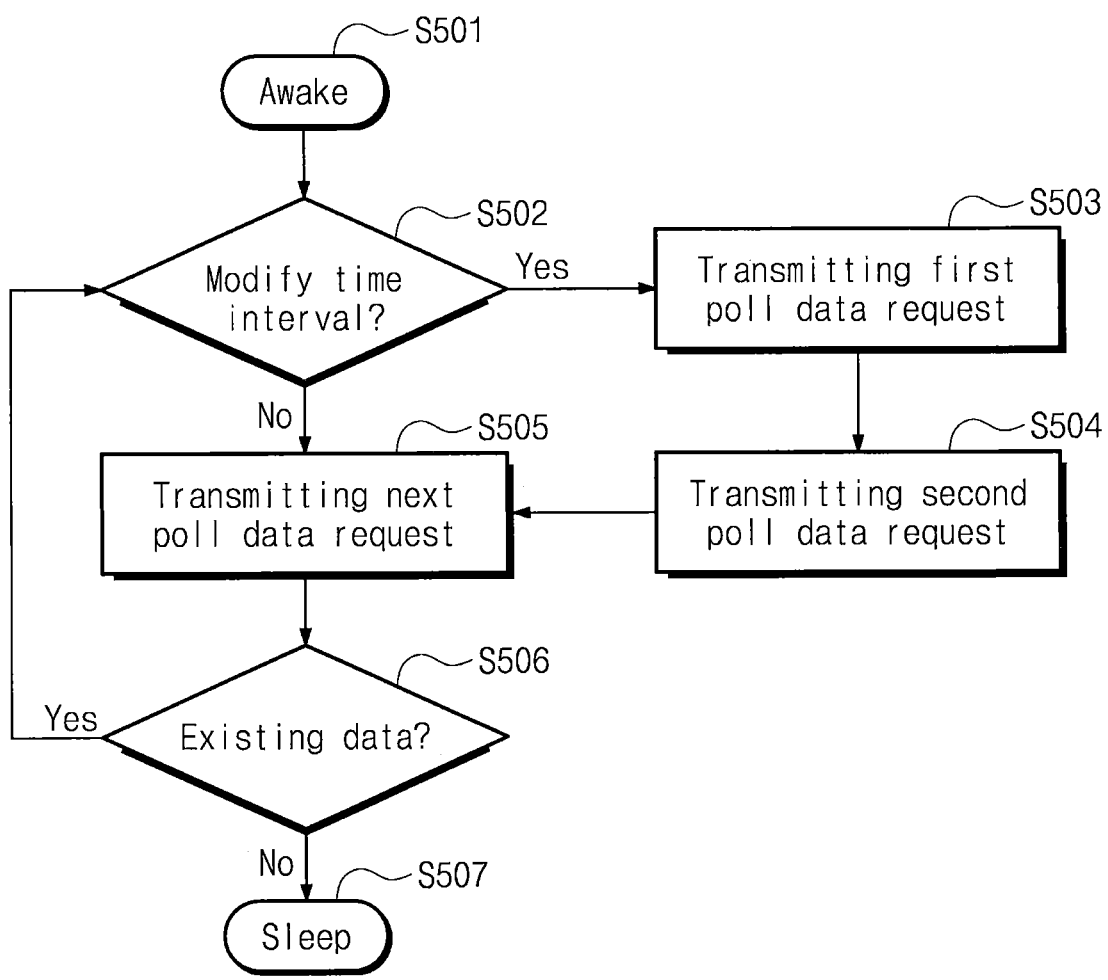
FIG. 5 illustrates a flowchart showing a terminal device switching from an awake state to a sleep state according to an example embodiment of the present disclosure.

FIG. 5 illustrates a flowchart showing a terminal device (e.g., terminal device 300 of FIG. 3) switching from an awake state to a sleep state according to an example embodiment of the present disclosure.

Referring to FIG. 5, at step S501, the terminal device may be in an awake state. At step S502, whether to modify a time interval for transmitting a poll data request may be determined. For example, after the terminal device is awakened (for example, through the poll data request), whether there is data to be transmitted in a parent node device may be checked. As mentioned above, when the pending bit in the Poll ACK is set as 1 (that is, there is the data to be transmitted) and a preset condition is met, the time interval may be modified (e.g., from a first time interval to a modified time interval). At step S502, if the time interval is modified (YES), at steps S503-S505, a predetermined number of (e.g., three) poll data requests may be transmitted successively. In some embodiments, the first two poll data requests may be used to request that the parent node device determine a new time interval, and an acknowledgement packet may be transmitted by the parent node device when the third poll data request is received. At step S506, it may be determined whether the data to be transmitted is received from the parent node device. If the data to be transmitted is received (YES), the process may return to step S502, and if the data to be transmitted is not received (NO), the process goes to step S507, where the terminal device is enabled to enter into a sleep mode. At step S502, a time interval for transmitting the poll data request may be modified according to a service requirement and/or a preset condition (for example, reducing or increasing the time interval). Preferably, in order to acquire the data in time, the time interval may be reduced.

In addition, an awaken time may be set for the terminal device, and the terminal device may include an awaken module. The awaken module may be configured to awaken the terminal device when the awaken time arrives.

The above example embodiments explain the indirect data transmission method and receiving method for the wireless network, the parent node device, and the terminal device, which are only examples.

In general, a sleep time interval (for example, an absolute difference between two time points at which the terminal device enters the sleep state successively) and a transmission interval for normally transmitting the poll data request (for example, an absolute difference between two time points at which two poll data requests are transmitted successively) of the terminal device are identical, and the time interval may be marked as T1.

In this case, since the parent node device only transmits one piece of data to be transmitted with respect to one poll data request, if the parent node device needs to transmit three pieces of data to be transmitted to the terminal device, the terminal device at least needs to transmit three poll data requests. In this way, a total time spent for transmitting all the three pieces of data to be transmitted to the terminal device is 3T1.

According to the embodiments described herein, after transmitting the first poll data request, the terminal device may learn that there is the data to be transmitted in the parent node device and may receive the first data to be transmitted. At this time, the total spent time is T1.

Then, the terminal device may transmit three poll data requests at a time interval T2. Two previous poll data requests are used by the parent node device to determine a new time interval, and to transmit the data to be transmitted to the cache of the MAC layer module in advance. After receiving the third poll data request, the second data to be transmitted may be transmitted to the terminal device. At this time, the total spent time is T1+3T2.

Next, the terminal device may transmit the fourth poll data request, and may receive the third data to be transmitted. At this time, the total spent time is T1+4T2.

As mentioned above, in the case where the time interval is not modified, the time spent for receiving three data to be transmitted is 3T1. In the case where the time interval is modified, the time spent for receiving three data to be transmitted is T1+4T2. In the case where T1 is much larger than T2, a data acquisition speed may be improved significantly.

After that, the terminal device may transmit the fifth poll data request, and may learn through the acknowledgement packet that there is no data to be transmitted to the terminal device. At this time, the terminal device may enter into the sleep state.

Figure 6:
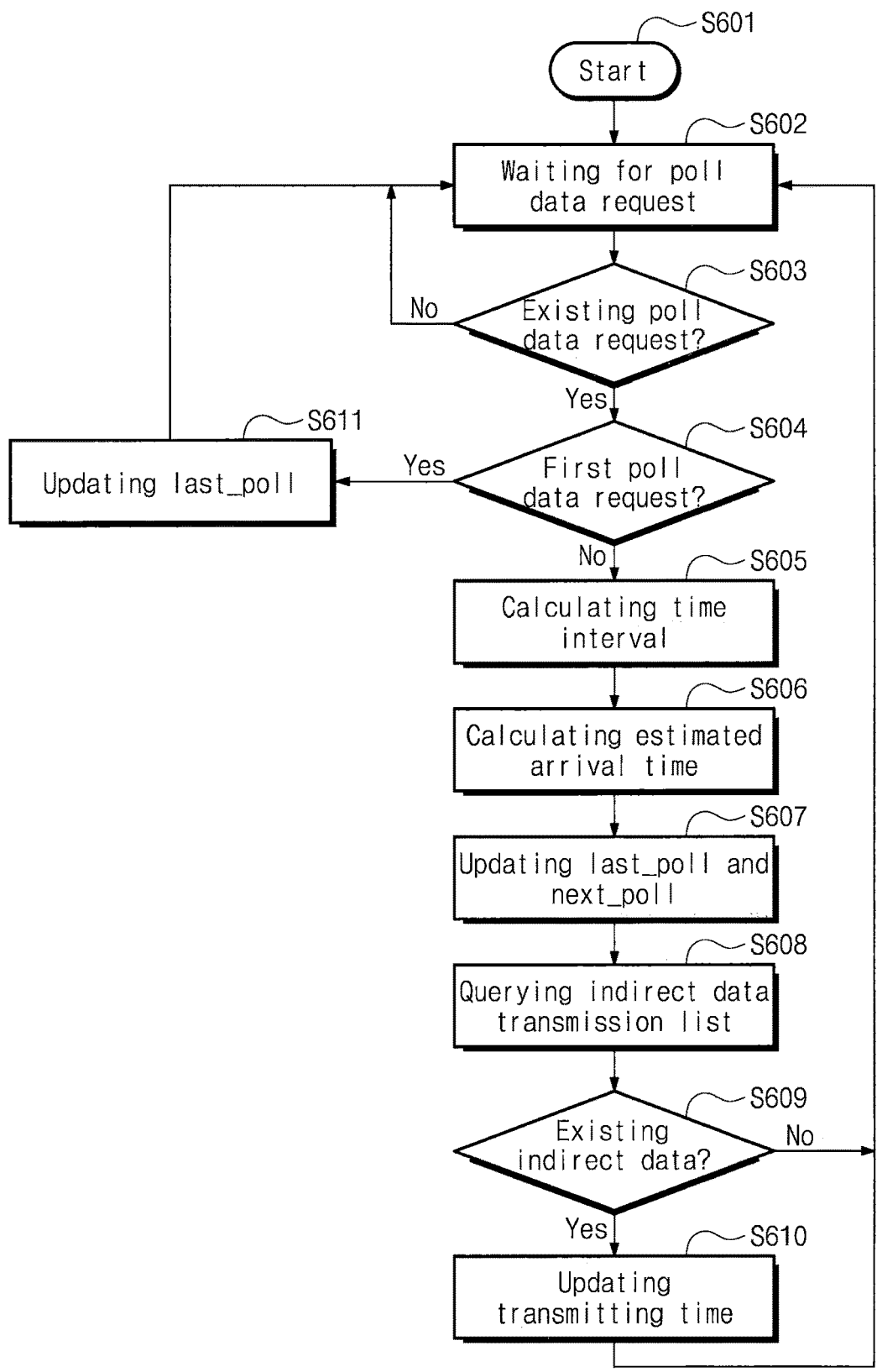
FIG. 6 illustrates a flowchart showing a parent node device performing indirect data transmission according to an example embodiment of the present disclosure.

FIG. 6 illustrates a flowchart showing a parent node device (e.g., parent node device 100 of FIG. 1) performing indirect data transmission to a terminal device (e.g., terminal device 300 of FIG. 3) according to an example embodiment of the present disclosure.

As shown in FIG. 6, at steps S602 and S603, processes may wait for receiving a poll data request from the terminal device and judging whether the poll data request exists. At step S603, if there is the poll data request (YES), at step S604, it may be determined whether it is the first time to receive the poll data request (e.g., this is a first poll data request). At step S604, if it is the first time to receive the poll data request (YES), at step S611, an attribute last_poll of a neighbor table is updated to a current time, then the process returns to step S602 to wait for another poll data request. If it is not the first time to receive the poll data request (NO), the process goes to steps S605-S607, last_poll may be subtracted from the current time to obtain a time interval (S605), the current time is added to the time interval to obtain an estimated arrival time for the next poll data request (S606), and last_poll is updated to the current time and an attribute next_poll of the neighbor table is updated to the estimated arrival time (S607). Then, at step S608, a data transmission list (or it may be referred to as an indirect data transmission list) is queried to determine whether there is an indirect data to be transmitted to terminal device (namely, data needs to be transmitted to the cache of the MAC layer module so as to be transmitted to the terminal device). At step S609, if there is data to be transmitted (YES), then a preset transmission time of the corresponding data in the data transmission list is updated to a time point which is a predetermined time length ahead of the estimated arrival time of the next poll data request (S610); if there is no data to be transmitted (NO), the process returns to step S602 to wait for another poll data request.

As mentioned in the above embodiment, the terminal device may modify the time interval for transmitting the poll data request to improve the indirect data transmission speed. The parent node device may transmit the data to the cache in advance, so as to timely transmit the data to the terminal device, thereby releasing a burden of the cache. The parent node device may also employ a separate type of MAC layer module, so as to improve compatibility.

In some embodiments of the present disclosure, the parent node device may transmit the data to be transmitted to the cache of the MAC layer module in advance, so as to transmit the data to be transmitted to the terminal device in time after receiving the poll data request of the terminal device, may transmit the data to be transmitted to the cache of the MAC layer module, and may prevent the terminal device from entering into a sleep state to receive the data to be transmitted, thereby transmitting the data to be transmitted to the terminal device timely and efficiently, and improving data transmission efficiency. After receiving the acknowledgement packet indicating that there is data to be transmitted, the terminal device may improve a frequency for transmitting the poll data request, so as to quickly receive the data to be transmitted through the acknowledgement packet, thereby improving data receiving efficiency.

According to an example embodiment of the present disclosure, an indirect data transmission method for a wireless network may include: calculating an estimated arrival time of a next poll data request of a terminal device according to a receipt time of a poll data request, after the poll data request is received from the terminal device; transmitting data for the terminal device to a cache of a Media Access Control (MAC) layer module at a time point which is a predetermined time length ahead of the estimated arrival time, responsive to a determination that the data for the terminal device exists in a network layer module; and transmitting, to the terminal device, an acknowledgement packet indicating that there is the data for the terminal device in the cache of the MAC layer module, and the data for the terminal device, responsive to receiving the next poll data request. Through this method and similar embodiments described herein, the data for the terminal device may be transmitted to the cache of the MAC layer module before receiving the next poll data request, so as to automatically, quickly, and timely make a response to transmit the data for the terminal device to the terminal device when receiving the next poll data request, thereby avoiding storing too much data into the cache of the MAC layer module, and improving a response speed of the parent node device.

In some embodiments, the calculating the estimated arrival time of the next poll data request of the terminal device may include: calculating a time interval between two continuous poll data requests of the terminal device; and acquiring the estimated arrival time according to the time interval and an arrival time of a previous poll data request. Through these steps and similar embodiments described herein, the estimated arrival time may be calculated quickly and accurately.

In some embodiments, the transmitting data for the terminal device to the cache of the MAC layer module at the time point which is the predetermined time length ahead of the estimated arrival time may include: establishing a data transmission list, wherein the data transmission list comprises the data for the terminal device and a preset transmission time corresponding to the data for the terminal device; updating the preset transmission time to the time point; and transmitting the data for the terminal device to the cache of the MAC layer module responsive to an arrival of the time point. Through these steps and similar embodiments described herein, transmission of the data to be transmitted may be managed uniformly, a transmission time of the data to be transmitted may be adjusted in time, and a processing speed of the parent node device may be improved.

In some embodiments, the wireless network may be a non-beacon ZigBee network, and the parent node device may be a ZigBee coordinator or a ZigBee router. It can be seen that this embodiment and similar embodiments described herein have a wide applicable scope and a strong compatibility.

According to an example embodiment of the present disclosure, an indirect data receiving method for a wireless network may include: modifying a time interval of transmitting a poll data request from a first time interval to a modified time interval according to a preset condition, responsive to receiving, at a terminal device from a parent node device, data for the terminal device and an acknowledgement packet indicating that there is the data for the terminal device; and transmitting at least three poll data requests to the parent node device at the modified time interval. Through this method and other similar embodiments described herein, the time interval at which the poll data request is transmitted may be adjusted in time, so as to receive the data to be transmitted in a corresponding speed from the parent node device, so that data transmission performance between the parent node device and the terminal device may be improved.

In some embodiments, the method may further include: resetting the modified time interval to the first time interval and enabling the terminal device to enter into a sleep mode responsive to receiving, from the parent node device, the acknowledgement packet indicating that there is no data for the terminal device after transmitting the at least three poll data requests to the parent node device at the modified time interval. Through these steps and other similar embodiments described herein, a velocity of transmitting the poll data request may be reset, a burden of the parent node device may be lightened, and the sleep state may be entered to reduce power consumption.

According to an example embodiment of the present disclosure, a non-transitory computer readable storage medium may store a computer program, wherein the computer program may be configured to enable a processor of a computer to execute any one of the above methods.

The methods and devices according to the example embodiments of the present disclosure may store a large amount of data to be transmitted to a terminal device (e.g., for the terminal device) into the network layer module supporting storage of a large amount of resources (for example, data) and having a low priority (for example, a schedule relating priority); store the data into the MAC layer module having a low resource (for example, a small cache) and a high priority before the calculated estimated arrival time of the next poll data request of the terminal device; and automatically and quickly respond to the poll data request when the poll data request is received by the parent node device, to transmit, to the terminal device, the acknowledgement packet indicating that there is the data to be transmitted to the terminal device and the data for the terminal device, thereby transmitting the data in the cache of the MAC layer module to the terminal device in time. In some embodiments, the data may be transmitted to the terminal device before the terminal device enters into the sleep mode, avoiding the case where the cache of the parent node device stores a large amount of data to be transmitted to the terminal device after the terminal device enters into the sleep mode. Some embodiments may be applicable for a case where a cache resource is limited (for example, the cache of the MAC layer module may be small) and/or a case of a separate type of MAC layer module, and indirect data transmission efficiency may be improved. In the case where time for the cache of the MAC layer module of the parent node device to store the data is short and/or the cache is small, a situation such as data loss in the case where the cache stores too much data may be avoided and/or a data loss rate may be reduced, so that indirect data transmission performance of the parent node device may be improved.

It should be understood that each of the modules or units in the parent node device and the terminal device according to the example embodiments of the present disclosure may be implemented as a hardware component and/or a software component. According to defined processing performed by each of the modules or units, those skilled in the art may implement each of the modules or units for example by using a Field Programmable Gate Array (FPGA) or an Application Specific Integrated Circuit (ASIC).

In addition, the indirect data transmission method and indirect data receiving method for the wireless network according to the example embodiments of the present disclosure may be implemented as computer code in a transitory or non-transitory computer readable recording medium. Those skilled in the art may implement the computer code according to the description of the above methods. When the computer code is executed in a computer, the above method of the present disclosure may be implemented.

It will be understood that although the terms "first," "second," etc. are used herein to describe members, regions, layers, portions, sections, components, and/or elements in example embodiments of the inventive concepts, the members, regions, layers, portions, sections, components, and/or elements should not be limited by these terms. These terms are only used to distinguish one member, region, portion, section, component, or element from another member, region, portion, section, component, or element. Thus, a first member, region, portion, section, component, or element described below may also be referred to as a second member, region, portion, section, component, or element without departing from the scope of the inventive concepts. For example, a first element may also be referred to as a second element, and similarly, a second element may also be referred to as a first element, without departing from the scope of the inventive concepts.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by those of ordinary skill in the art to which the inventive concepts pertain. It will also be understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

Although some example embodiments of the present disclosure are expressed and described, those skilled in the art should understand that, modification may be made to these embodiments without departing from the principle and spirit of the present disclosure of which the scope is defined by the claims and the equivalents thereof.

What is claimed is:

1. A data transmission method for a wireless network, comprising:
   calculating an estimated arrival time of a next poll data request of a terminal device according to a receipt time of a poll data request, after the poll data request is received from the terminal device;
   transmitting data for the terminal device to a cache of a Media Access Control (MAC) layer module at a time point which is a predetermined time length ahead of the estimated arrival time, responsive to a determination that the data for the terminal device is in a network layer module; and
   transmitting, to the terminal device, an acknowledgement packet indicating that the data for the terminal device is in the cache of the MAC layer module, and the data for the terminal device, responsive to receiving the next poll data request.

2. The method of claim 1, wherein the poll data request is one of a plurality of poll data requests of the terminal device, and
   wherein the calculating the estimated arrival time of the next poll data request of the terminal device comprises:
   calculating a time interval between two continuous poll data requests of the plurality of poll data requests of the terminal device; and
   acquiring the estimated arrival time according to the time interval and an arrival time of one of the plurality of poll data requests.

3. The method of claim 1, wherein the transmitting data for the terminal device to the cache of the MAC layer module at the time point which is the predetermined time length ahead of the estimated arrival time comprises:
   establishing a data transmission list, wherein the data transmission list comprises the data for the terminal device and a preset transmission time corresponding to the data for the terminal device;
   updating the preset transmission time to the time point; and
   transmitting the data for the terminal device to the cache of the MAC layer module responsive to an arrival of the time point.

4. The method of claim 3, further comprising:
   receiving a success confirmation message from the terminal device indicating that the data for the terminal device has been received by the terminal device; and
   removing the data for the terminal device and the preset transmission time from the data transmission list responsive to receiving the success confirmation message.

5. The method of claim 3, further comprising:
   responsive to transmitting the data for the terminal device to the cache of the MAC layer module, marking an entry in the data transmission list to indicate that the data for the terminal device has been transmitted.

6. The method of claim 5, further comprising:
   responsive to failing to receive the next poll data request at the estimated arrival time, unmarking the entry in the data transmission list to indicate that transmission of the data for the terminal device has failed.

7. The method of claim 6, further comprising:
   responsive to transmission of the data for the terminal device failing more than a preset number of times, removing the data for the terminal device from the data transmission list.

8. The method of claim 1, wherein the wireless network is a non-beacon ZigBee network.

9. A parent node device for a wireless network, comprising:
   a non-transitory computer readable storage medium configured to store instructions comprising a network layer module and a Media Access Control (MAC) layer module; and
   a processor,
   wherein the processor is configured to execute the network layer module to calculate an estimated arrival time of a next poll data request of a terminal device according to a receipt time of a poll data request that is received from the terminal device, and transmit data for the terminal device to a cache of the MAC layer module at a time point which is a predetermined time length ahead of the estimated arrival time, responsive to a determination that the data for the terminal device is in the network layer module, and wherein the processor is further configured to execute the MAC layer module to transmit, to the terminal device, an acknowledgement packet indicating that the data for the terminal device is in the cache of the MAC layer module, and the data for the terminal device, responsive to receiving the next poll data request.

10. The parent node device of claim 9, wherein the poll data request is one of a plurality of poll data requests of the terminal device, and wherein the network layer module comprises:
a time interval calculation module configured to calculate a time interval between two continuous poll data requests of the plurality of poll data requests of the terminal device; and
an estimated arrival time acquisition module configured to acquire the estimated arrival time according to the time interval and an arrival time of one of the plurality of poll data requests.

11. The parent node device of claim 9, wherein the network layer module comprises:
a transmission list management module configured to establish a data transmission list and to update a preset transmission time to the time point, wherein the data transmission list comprises the data for the terminal device and the preset transmission time corresponding to the data for the terminal device; and
a timing transmission module configured to transmit the data for the terminal device to the cache of the MAC layer module responsive to an arrival of the time point.

12. The parent node device of claim 11, wherein the network layer module is configured to receive a success confirmation message from the terminal device indicating that the data for the terminal device has been received by the terminal device, and wherein the transmission list management module is configured to remove the data for the terminal device and the preset transmission time from the data transmission list responsive to receiving the success confirmation message.

13. The parent node device of claim 11, wherein the transmission list management module is configured to mark an entry in the data transmission list to indicate that the data for the terminal device has been transmitted responsive to transmitting the data for the terminal device to the cache of the MAC layer module.

14. The parent node device of claim 13, wherein the transmission list management module is configured to unmark the entry in the data transmission list to indicate that transmission of the data for the terminal device has failed responsive to the parent node device failing to receive the next poll data request at the estimated arrival time.

15. The parent node device of claim 14, wherein the transmission list management module is configured to remove the data for the terminal device from the data transmission list responsive to transmission of the data for the terminal device failing more than a preset number of times.

16. The parent node device of claim 9, wherein the wireless network is a non-beacon ZigBee network, and the parent node device is a ZigBee coordinator or a ZigBee router.

17. A terminal device for a wireless network, the terminal device comprising:
a processor; and
a memory, the processor configured to execute instructions residing in the memory to perform operations comprising:
modifying a time interval of transmitting a poll data request from a first time interval to a modified time interval according to a preset condition responsive to receiving, from a parent node device, data for the terminal device and an acknowledgement packet indicating that the data for the terminal device is present on the parent node device; and
transmitting at least three poll data requests to the parent node device at the modified time interval.

18. The terminal device of claim 17, wherein the operations further comprise:
resetting the modified time interval to the first time interval responsive to receiving, from the parent node device, a second acknowledgement packet indicating that there is no data for the terminal device; and
enabling the terminal device to enter into a sleep mode when the modified time interval is reset to the first time interval.

19. The terminal device of claim 17, wherein the preset condition is set based on a user's requirement and/or a time of day.

20. The terminal device of claim 19, wherein the time interval is modified to be shortened at daytime and the time interval is modified to be increased at night.

* * * * *